United States Patent [19]
Mikami et al.

[11] Patent Number: 5,598,227
[45] Date of Patent: Jan. 28, 1997

[54] TELEVISION CAMERA/RECORDER AND A SYSTEM FOR TRANSMITTING SIGNALS REPRODUCED BY THE SAME

[75] Inventors: Tsutomu Mikami, Saitama; Masayasu Kaneko, Ibaragi; Yoshiharu Murase, Saitama, all of Japan

[73] Assignee: Sony Corporation, Tokyo, Japan

[21] Appl. No.: 163,524

[22] Filed: Dec. 9, 1993

[30] Foreign Application Priority Data

Dec. 24, 1992 [JP] Japan ................................. 4-357657

[51] Int. Cl.$^6$ .............................. H04N 5/44; H04N 5/225
[52] U.S. Cl. ........................ 348/725; 348/706; 348/730; 358/906
[58] Field of Search ................................ 348/730, 725, 348/723, 706, 552, 731, 6; 455/14, 18, 185.1; 358/335, 906; H04N 5/44, 5/225

[56] References Cited

U.S. PATENT DOCUMENTS

| | | | |
|---|---|---|---|
| 4,367,557 | 1/1983 | Stern et al. | 348/6 |
| 4,745,478 | 5/1988 | Nakagawa et al. | 348/706 |
| 4,777,526 | 10/1988 | Saitoh et al. | 348/6 |
| 4,855,611 | 8/1989 | Isobe et al. | 348/706 |
| 4,903,130 | 2/1990 | Kitagawa et al. | 348/706 |
| 5,264,935 | 11/1993 | Nakajima | 358/181 |
| 5,297,204 | 3/1994 | Levine | 358/335 |
| 5,299,010 | 3/1994 | Nakazawa et al. | 348/731 |

FOREIGN PATENT DOCUMENTS 2238624  6/1991  United Kingdom .

*Primary Examiner*—James J. Groody
*Assistant Examiner*—Jeffrey S. Murrell
*Attorney, Agent, or Firm*—Jay H. Maioli

[57] ABSTRACT

A television camera/recorder comprises a television camera unit for converting a scene into corresponding electrical signals, and a VTR for recording the electrical signals provided by the television camera unit and reproducing the recorded electrical signals. The signals reproduced by the VTR are converted into carrier television signals by an internal RF converter, and the carrier television signals are sent to an external television receiver through a first output jack connected by a cord to the external television receiver. The television camera/recorder may be additionally provided with an adapter capable of being detachably connected to a case containing the television camera unit, the VTR unit and the RF converter and provided with a second output jack capable of being connected to the first output jack provided on the case when the adapter is joined to the case.

9 Claims, 11 Drawing Sheets

FIG. 3
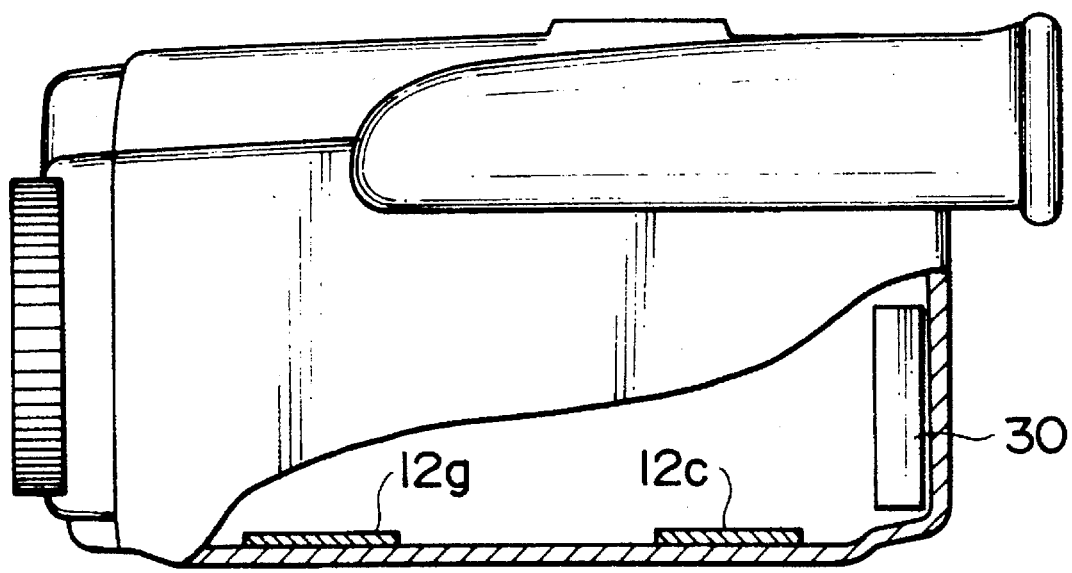
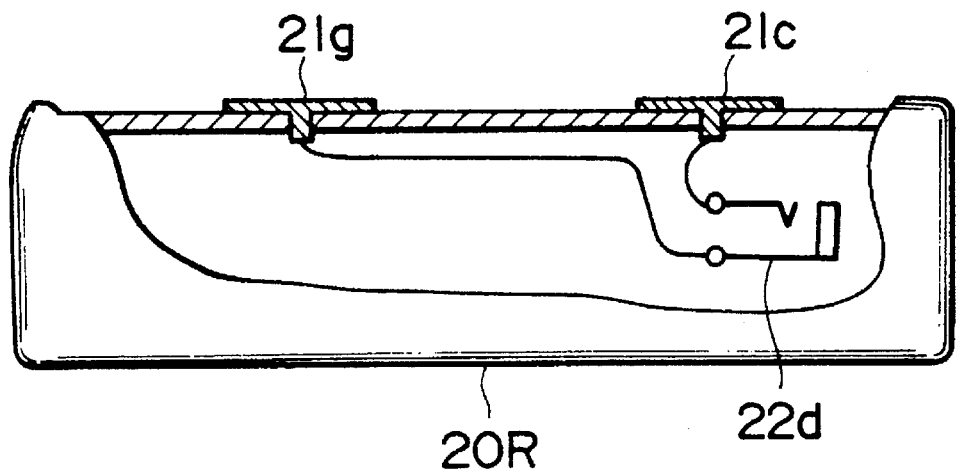

FIG. 4
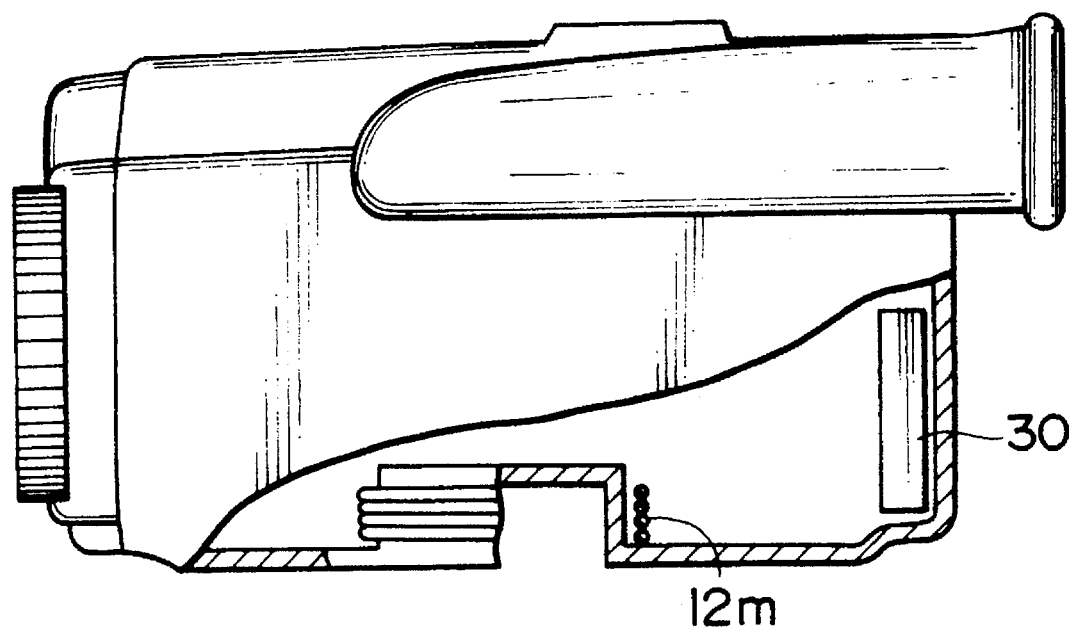
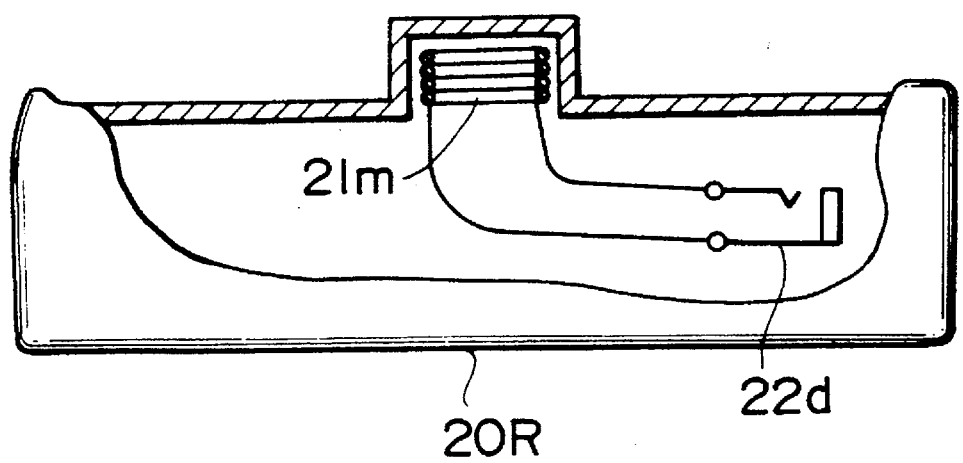

TELEVISION CAMERA/RECORDER AND A SYSTEM FOR TRANSMITTING SIGNALS REPRODUCED BY THE SAME

BACKGROUND OF THE INVENTION

1. Field of the Invention

The present invention relates to a television camera/recorder, which is generally known as Camcorder—consisting of a television camera and a VTR, and a system for transmitting signals reproduced by the television camera/recorder.

2. Description of the Related Art

Recently, the use of a television camera/recorder integrally comprising a domestic television camera and a VTR has become prevalent. In the television camera/recorder, video signals produced by the television camera are recorded by the VTR on a magnetic tape, and the VTR reproduces the video signals from the magnetic tape and transmits the reproduced video signals to a monitoring receiver or a television receiver. Then, the monitoring receiver or the television receiver displays pictures represented by the video signals on its display. In the following description, a receiver provided with a video signal input terminal and an audio signal input terminal will be called a monitoring receiver, and a receiver not provided with any video signal input terminal and any audio signal input terminal and provided with only an antenna terminal will be called a television receiver to simplify the description.

Referring to FIG. 8, when displaying a picture on and reproducing sounds by a monitoring receiver 1 provided with a video signal I/O terminal 1v and an audio signal I/O terminals 1a, the video signal I/O terminal 11v and the audio signal I/O terminal 11a having two jacks for two-channel stereo audio signals of a conventional television camera/recorder 10 are connected respectively to the video signal I/O terminal 1v and the audio signal I/O terminal 1a by a 13-pin cord CB. When an external microphone is used in combination with the television camera/recorder 10, a dc supply voltage is applied to the external microphone through dc voltage output terminal 11d. The dc voltage that appears at the dc voltage output terminal can be used as an antenna changing signal when a RF converter is used, which will be described later.

FIG. 9 shows a known system comprising a television camera/recorder 10 and an adapter 20. Video signals reproduced by the television camera/recorder 10 can be supplied to a monitoring receiver 1 simply by placing the television camera/recorder on the adapter 20 and setting the television camera/recorder 10 to a reproducing mode to display pictures represented by the reproduced video signals on the monitoring receiver 1. As shown in FIG. 9, the television camera/recorder 10 is provided on its bottom wall with a video signal output electrode 12v, audio signal output electrodes 12a, a dc voltage output electrode 12d, which corresponds to the dc voltage output terminal 11d, a video signal grounding electrode Ev, an audio signal grounding electrode Ea, and a dc voltage grounding electrode Ed. The signal system and the power system of the television camera/recorder are grounded individually. The conductors 12v, 12a, 12d, Ev, Ea and Ed are formed of a conductive metal.

The adapter 20 is provided on its upper wall on which the television camera/recorder 10 is placed with a video signal input electrode 21v, audio input electrodes 21a, a dc voltage input electrode 21d, and grounding electrodes with which the output electrodes 12v, 12a and 12d, and the grounding electrodes Ev, Ea and Ed come into contact when the television camera/recorder 10 is placed on the adapter 20. Output terminals (jacks) 22v, 22a and 22d to be connected through amplifiers, not shown, respectively to the electrodes 21v, 21a and 21d are arranged on the side wall of the adapter 20.

The output terminals 22v and 22a are connected constantly to the input terminals 1v and 1a of a monitoring receiver 1, respectively, by an AV cord. Consequently, the output electrodes 12v and 12a of the television camera/recorder 10 are connected electrically through the input electrodes 21v and 21a and the output terminals 22v and 22a of the adapter 20 to the video signal input terminal 1v and the audio signal input terminals 1a of the monitoring receiver 1 simply by placing the television camera/recorder 10 on the adapter 20 to apply video signals and audio signals reproduced by the television camera/recorder 10 to the monitoring receiver 1, and then the monitoring receiver 1 reproduces images and sounds.

When reproducing images on a television receiver provided with neither video signal input terminals nor audio signal input terminals, signals reproduced by the television camera/recorder 10 are converted into signals of an idle channel for television broadcasting, i.e., carrier television signals by a separate RF converter and the carrier television signals are transmitted to the antenna terminal of the television receiver through a circuit as shown in FIG. 9.

Referring to FIG. 10 and 11, a television receiver 2 is provided with a receiving antenna 3 for receiving television signals. A RF converter 30C is connected to an antenna switch 30SW by a cord 38. The RF converter 30C is provided with a video signal input terminal (plug) 31v, audio signal input terminals (plug) 31aR and 31aL, which are denoted inclusively by 31a, and a dc power input terminal (2-pole miniplug) 31d. The RF converter 30C is joined to the television camera/recorder 10 with its video signal input terminal 31v, audio signal input terminals 31a and the dc power input terminal 31d connected respectively to the video signal I/O terminal 11v, the audio signal I/O terminals 11a and the dc power output terminal 11d (such as a 2-pole minijack) of the television camera/recorder 10, Dc power is supplied from the television camera/recorder 10 to the RF converter 30C through the dc I/O terminal 11d of the television camera/recorder 10 and the dc input terminal 31d of the RF converter 30C.

Video signals Sv provided by a video signal processing circuit 14v included in the television camera/recorder 10 and audio signals Sa provided by an audio signal processing circuit 14a included in the television camera/recorder 10 are transmitted respectively through I/O transfer switches 13v and 13a to modulators 33v and 33a included in the conversion circuit 32 of the RF converter 30C. The modulator 33v of the RF converter 30C converts the output of an oscillator 34 of a predetermined channel for amplitude modulation to provide a video carrier signal Srv, and another modulator 33a modulates the output of an oscillator, not shown, of a suitable frequency for frequency modulation. The output of the modulator 33a is converted into a carrier audio signal Sra by beat-up or the like. Then, the video signals Sv and the audio signals Sa are converted into carrier television signals Srf of an idle television channel in a VHF band or a UHF band.

Resonators 36a and 36b respectively corresponding to two idle channels A and B which are not used in an area in which the RF converter 30C is used are connected through a transfer switch 35 to the oscillator 34. Either the resonator 36a or the resonator 36b is selected by the transfer switch 35 to select either the idle channel A or the idle channel B. The carrier television signals Srf provided by the conversion circuit 32 are transmitted through a suitable band-pass filter 37 to an electronic or mechanical switch 39 included in the antenna switch 30SW. The carrier television signals Srf are transmitted through the movable contact and the r-side fixed contact of the switch 39 to the antenna terminal 2a of a television receiver 2. Then, the television receiver 2 displays pictures represented by the reproduced video signals on its screen and generates sounds represented by the reproduced audio signals by its loudspeakers.

The receiving antenna 3 is connected to the a-side fixed contact of the transfer switch 39. When the RF converter 30C is used, the movable contact of the switch 39 is connected to the r-side fixed contact by dc power supplied through the output terminal 11d and the dc power input terminal 31d of the RF converter 30C by a power control circuit 15 included in the television camera/recorder 10 to avoid interference in television receivers in the neighborhood of the RF converter 30C. The power control circuit 15 is provided with a current intensity detecting means, not shown. When the current intensity detecting means detects the flow of an excessively high current through the dc power output terminal 11d due to short-circuiting or the like, the power control circuit 15 decreases the output voltage to maintain the intensity of the current flowing through the dc power output terminal 11d within a predetermined output power range.

Thus, four connecting systems are necessary for connecting the RF converter 30C and the television camera/recorder 10 for video signals, stereophonic signals including right-channel audio signals and left-channel audio signals, and dc power. At least three connecting systems are necessary even if monophonic signals are used.

When a high-performance external microphone, such as an electret microphone, is used to record sounds in combination with the television camera/recorder 10 when televising a scene by the television camera/recorder 15, power is supplied to the external microphone through the dc power output terminal 11d.

When the adapter 20 is provided with a dc voltage output electrode 21d and a dc voltage output terminal on its upper wall and side wall, the RF converter 30C can be connected to the adapter 20 to enable the image of the scene formed by the television camera/recorder 10 to be displayed in corresponding pictures on the television receiver 2 by the foregoing very simple procedure.

As mentioned above, when the conventional television camera/recorder 10 is not used for televising a scene or reproducing recorded signals, the transfer switch 13v and 13a are set so as to transmit signals reproduced by an ordinary VTR or video and audio signals provided by a TV tuner through the video signal I/O terminal 11v and the audio signal I/O terminals 11a to the video signal processing circuit 14v and the audio signal processing circuit 14a to record the signals reproduced by the ordinary VTR or the video and audio signals provided by the TV tuner in the same recording manner as that in which an ordinary VTR records signals.

The RF converter 30C separate from the television camera/recorder 10 is connected to the television camera/recorder 10 by plugging the video signal input terminal 31v, the audio signal input terminals 31a and the dc power input terminal 31d, which are formed in plugs, respectively in the video signal I/O terminal 11v, the audio signal I/O terminals 11a and the dc power output terminal 11d, which are formed in jacks. Therefore, when the television camera/recorder 10 and the RF converter 30C are thus combined, the video signal I/O terminal 11v and the audio signal I/O terminals 11a are occupied and hence the television camera/recorder is unable to function as an individual VTR. Furthermore, since the jacks of the television camera/recorder 10 are inserted in the jacks of the RF converter 30C when combining the television camera/recorder 10 and the RF converter 30C, it is not necessarily easy to join the RF converter 30C to, and to separate the same from, the television camera/recorder 10, which deteriorates the reliability of the electrical connection of the plugs and the jacks.

SUMMARY OF THE INVENTION

Accordingly, it is an object of the present invention to provide a television camera/recorder capable of solving the foregoing problems in the related art and of enabling a television receiver to receive easily signals reproduced by the television camera/recorder, and a reproduced signal transmission system for transmitting signals reproduced by the television camera/recorder.

A television camera/recorder in a first aspect of the present invention comprises, in an integral combination: a television camera unit; a VTR unit for recording and reproducing signals provided by the television camera unit; a RF converter for converting video and audio signals reproduced by the VTR unit into carrier television signals of a predetermined television channel and sending the carrier television signals to the antenna terminal of a television receiver; and a jack through which the carrier television signals Srf superposed on a predetermined dc power is provided.

Since the reproduced video and audio signals are converted into the carrier television signals by the RF converter and the carrier television signals are superposed on the dc voltage, the signals reproduced by the television camera/recorder can be readily transmitted to a television receiver simply by plugging a plug in an output jack at which the reproduced signals appear. Accordingly, the video signal I/O terminal and the audio signal I/O terminal of the television camera/recorder are not occupied and the same can be used for desired purposes while the reproduced signals provided by the RF converter are being transmitted to the television receiver.

A television camera/recorder in a second aspect of the present invention comprises, in an integral combination: a television camera unit; a VTR unit for recording and reproducing signals provided by the television camera unit; a RF converter for converting video and audio signals reproduced by the VTR unit into carrier television signals of a predetermined television channel and applying the carrier television signals to the antenna terminal of a television receiver; an adapter to be connected to the antenna terminal of the television receiver; and a detachable connector for transmitting the carrier television signals to the adapter connected to the antenna terminal of the television receiver.

The television camera/recorder in the first aspect of the present invention converts the signals reproduced by the VTR unit into the carrier television signals, which can be easily transmitted, by the RF converter, applies the carrier television signals to the antenna terminal of the television receiver to display pictures represented by the reproduced signals on the screen of the television receiver.

The television camera/recorder in the second aspect of the present invention converts reproduced signals into carrier television signals by the RF converter and the carrier television signals are transferred through a simple connecting means, such as a single set of terminals, to the adapter detachably joined to the television camera/recorder. Accordingly, the reproduced video and audio signals can be readily transmitted to a television receiver simply by placing the television camera/recorder on the adapter when the adapter is connected to the antenna terminal of the television receiver. Furthermore, since the type of the plug plugged in the output jack at which the carrier television signals are superposed on the dc voltage can be identified and the application of the carrier television signals to the output jack is stopped when the carrier television signals need not be applied to the antenna terminal of the television receiver, unnecessary radiation of the carrier television signals can be obviated.

BRIEF DESCRIPTION OF THE INVENTION

The above and other objects, features and advantages of the present invention will become more apparent from the following description taken in connection with the accompanying drawings, in which:

FIG. 3 is a partly cutaway side view of a television camera/recorder in a modification of the television camera/recorder of FIG. 1;

FIG. 4 is a partly cutaway side view of a television camera/recorder in another modification of the television camera/recorder of FIG. 1;

DETAILED DESCRIPTION OF THE PREFERRED EMBODIMENTS

Figure 10:
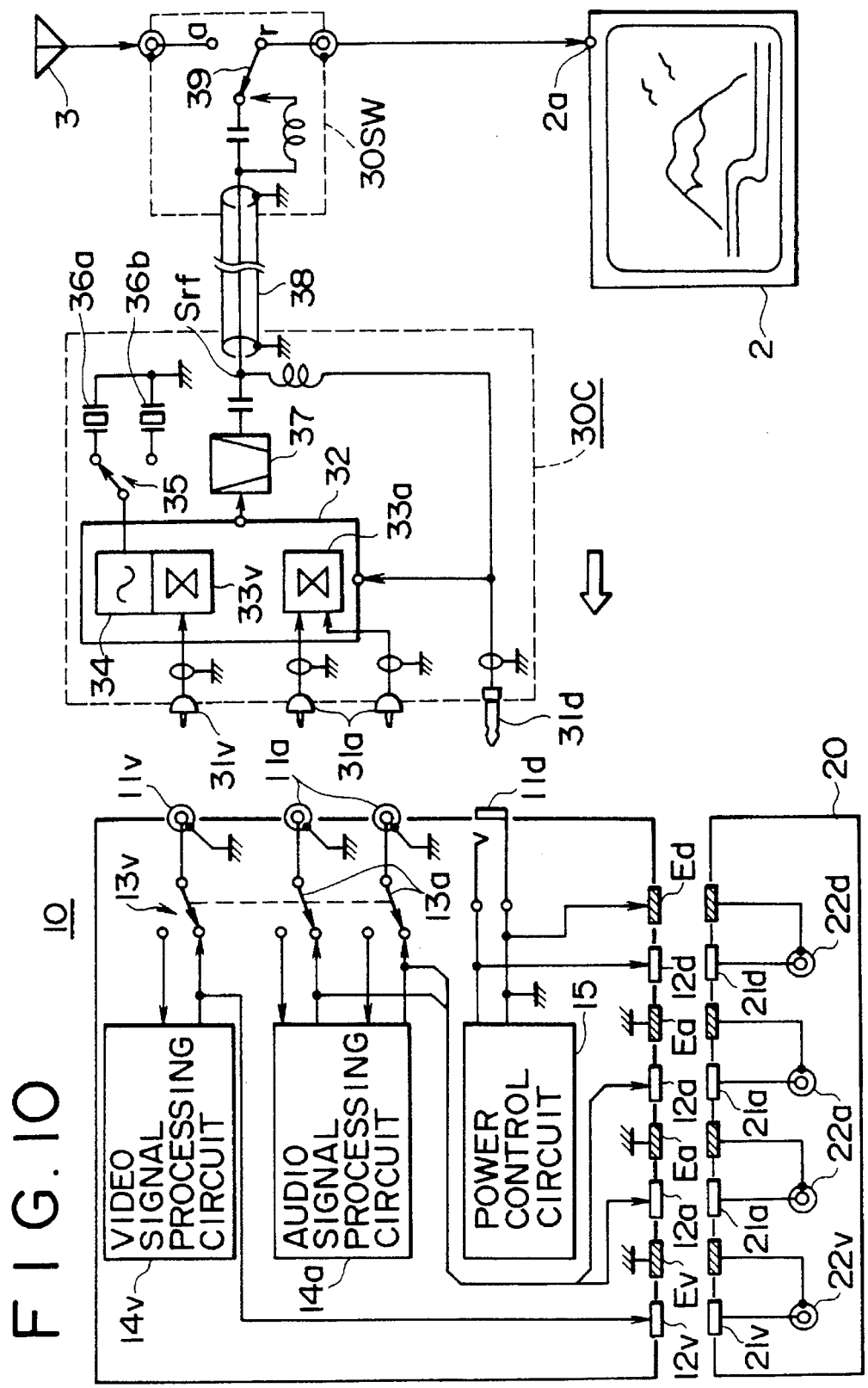
FIG. 10 is a circuit diagram of a reproduced signal transmission system incorporated into the television camera/recorder of FIG. 8 or 9.
Figure 11:
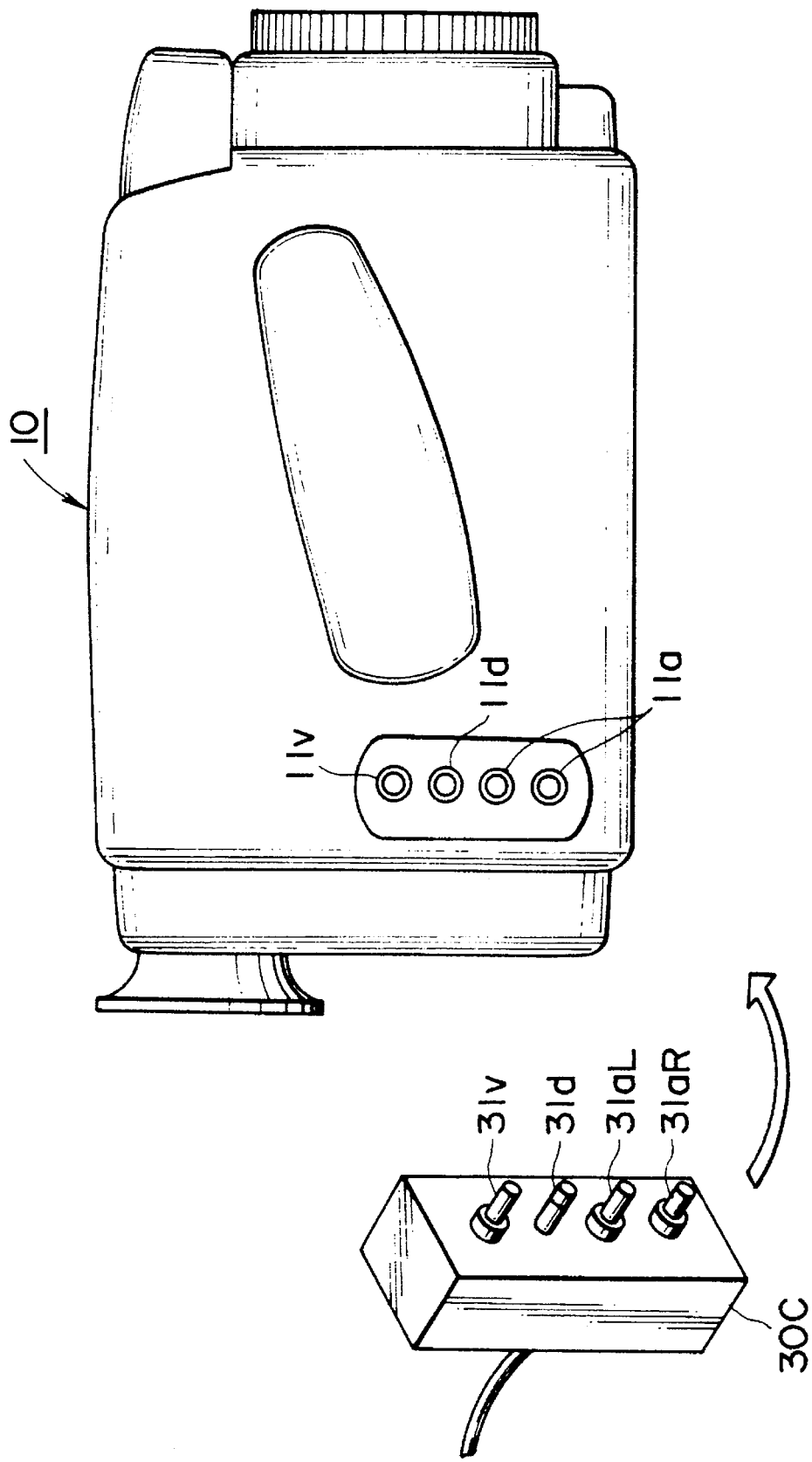
FIG. 11 is a schematic view of assistance in explaining a reproduced signal transmission system incorporated into a conventional television camera/recorder.

A television camera/recorder in a first embodiment according to the present invention will be described hereinafter with reference to FIGS. 1 to 3, in which parts like or corresponding to those previously described with reference to FIG. 10 are denoted by the same reference characters and the description thereof will be omitted.

Figure 1:
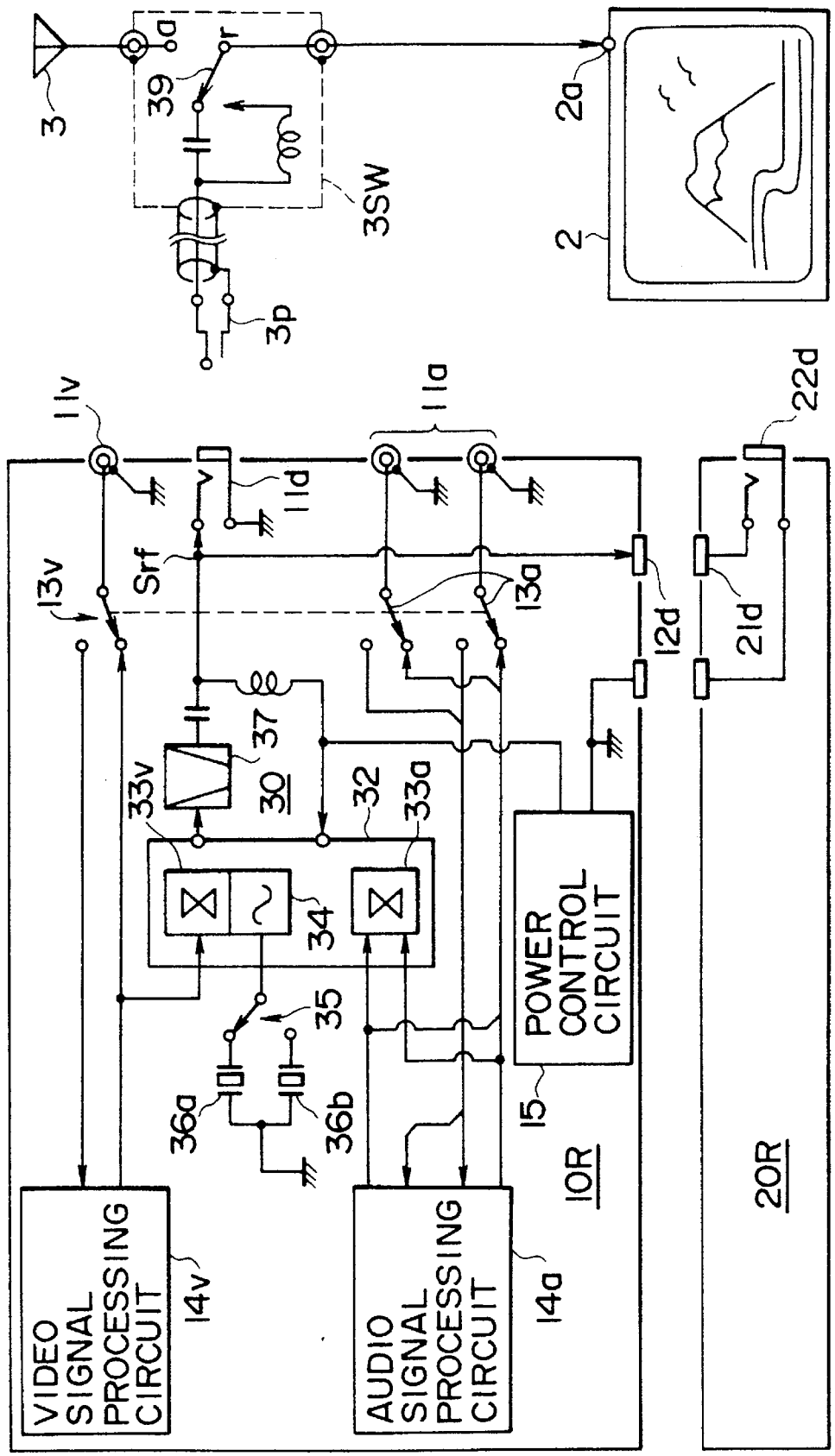
FIG. 1 is a circuit diagram of a reproduced signal transmission system incorporated into a television camera/recorder in a first embodiment according to the present invention.
Figure 2:
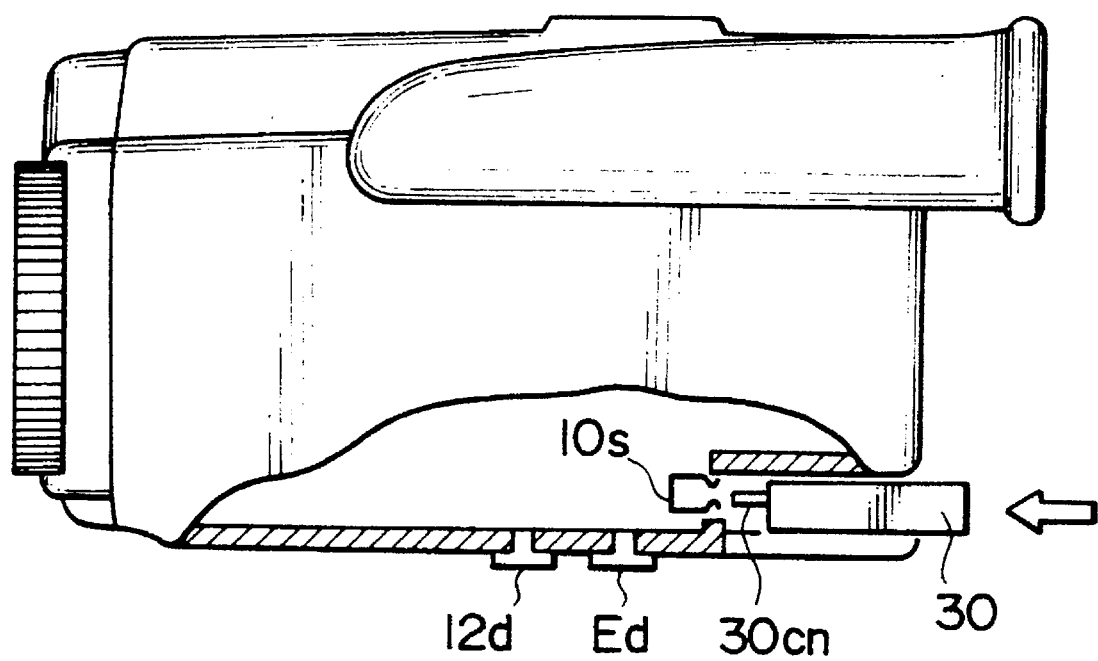
FIG. 2 is a partly cutaway side view of the television camera/recorder in the first embodiment.

Referring to FIGS. 1 and 2, a television camera/recorder 10R in the first embodiment is provided with an internal connector 10s. A plug-in RF converter 30 is integrated with the television camera/recorder 10R by plugging its flat connector 30cn into the connector 10s. In the television camera/recorder 10R, video signals Sv provided by a video signal processing circuit 14v and audio signals Sa provided by an audio signal processing circuit 14a are given respectively to the video signal converter 33v and the audio signal converter 33a of a conversion circuit 32 included in the RF converter 30. A power control circuit 15 supplies dc power directly to the conversion circuit 32. Carrier television signals Srf of a suitable television channel provided by the RF converter 30 are superposed on a dc power supplied by the power control circuit 15 to operate an antenna switch 3SW at a jack 11d, which serves as an output terminal for both the carrier television signals Srf and the dc power. A plug 3p connected to the antenna switch 3SW is plugged in the jack 11d. The antenna switch 3SW is identical with the antenna switch 30SW shown in FIG. 10. When the plug 3p is plugged in the jack 11d, a dc voltage is applied to a transfer switch 39 to connect the movable contact of the transfer switch 39 to the fixed contact r of the same and, consequently, the carrier television signals Srf provided by the television camera/recorder 10R are applied to the antenna terminal 2a of a television receiver 2 to display pictures represented by the carrier television signals Srf on the screen of the television receiver 2.

When the television camera/recorder 10R is provided internally with a secondary battery, it is possible to charge the secondary battery by providing an adapter 20R with a charger so that the secondary battery is connected to the charger when the television camera/recorder 10R is placed on the adapter 20R to charge the secondary battery in a boost charge mode or to use the secondary battery as a floating battery.

The television camera/recorder 10R is provided on its bottom wall with an output electrode 12d corresponding to the jack 11d, and the adapter 20R is provided with an input electrode 21d and a jack 22d connected to the input electrode 21d on its upper wall and side wall, respectively. When the plug 3p connected to the antenna switch 3SW is connected to the jack 22d, it is possible to apply the carrier television signals Srf through the adapter 20R to the antenna terminal 2a of the television receiver 2 simply by placing the television camera/recorder 10R on the adapter 20R and setting the television camera/recorder for a reproducing mode.

Since the television camera/recorder 10R is provided integrally with the RF converter 30, the carrier television signals Srf can be given to the television receiver 2 simply by plugging the plug 3p in the jack 11d of the television camera/recorder 10R or the jack 22d of the adapter 20R. Thus, the video signal I/O terminal 11v and the audio signal I/O terminals 11a of the television camera/recorder 10R are not occupied when the plug 3p is plugged in the jack 11d, and the television camera/recorder 10R can be used as a VTR. Since the plug 3p can be easily plugged in and disconnected from the jack 11d, the reliable contact between the plug 3p and the jack 11d can be secured.

The television camera/recorder 10R may be provided with an internal RF converter equivalent to the RF converter 30 as shown in FIG. 3, which will reduce the cost of the arrangement for connecting the television camera/recorder 10R to the television receiver 2.

When the antenna switch 39 is unnecessary, the carrier television signals Srf can be transferred from the television camera/recorder 10R to the adapter 20R through the capacitive coupling of electrodes 12c and 21c and electrodes 12g and 21g provided opposite to each other respectively on the television camera/recorder 10R and the adapter 20R as shown in FIG. 3, through the magnetic coupling of coils 12m and 21m provided respectively on the television camera/recorder 10R and the adapter 20R as shown in FIG. 4 or through the optical coupling of the television camera/recorder 10R and the adapter 20R.

When the plug-in RF converter 30 is not employed, a separate RF converter 30C may be used if the relative positions of the video signal I/O terminal 11v, the audio signal I/O terminals 11a and the jack 11d are unchanged.

A television camera/recorder in a second embodiment according to the present invention will be described hereinafter with reference to FIG. 5, in which parts like or corresponding to those shown in FIG. 1 are denoted by the same reference characters and the description thereof will be omitted to avoid duplication.

In the first embodiment shown in FIG. 1, the plug-in RF converter 30 is incorporated integrally into the television camera/recorder 10R and the carrier television signals Srf are applied to the dc output terminal, such as a 2-pole minijack. Therefore, if a high-performance external microphone is used, the carrier television signals Srf are given purposelessly to the external microphone through the dc output terminal 11d when the television camera/recorder is used as a television camera, and there is the possibility that the carrier television signals Srf transmitted from the cord attached to the external microphone disturb television receivers in the neighborhood.

Figure 5:
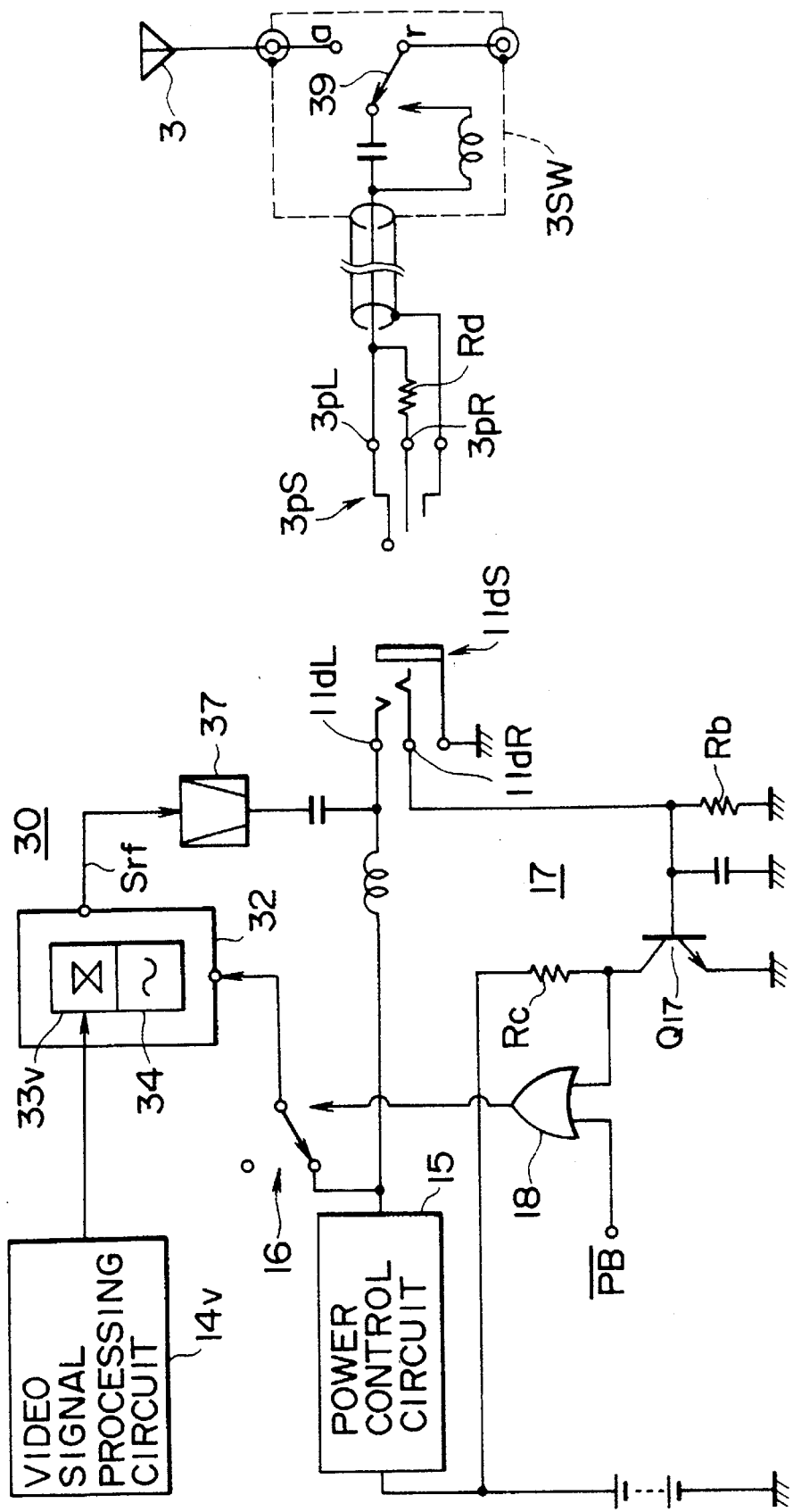
FIG. 5 is a circuit diagram of an essential portion of a television camera/recorder in a second embodiment according to the present invention.

The television camera/recorder 10R in the second embodiment shown in FIG. 5 decides whether an antenna switch is connected to the common output terminal or whether an external microphone is connected to the common output terminal and controls the supply of the carrier television signals on the basis of the decision.

Referring to FIG. 5, a switch 16 is inserted in a line connecting a power control circuit 15 and a RF conversion circuit 32, the left-channel terminal 11dL of a 3-pole minijack 11ds for stereophonic signals is used as a common output terminal for both dc power and the output of the RF conversion circuit 32, and the right-channel terminal 11dR of the 3-pole minijack 11ds is connected to a plug identifying circuit 17. The plug identifying circuit 17 comprises, for example, an emitter-grounded npn transistor Q17 and resistors Rb and Rc. An antenna switch 3SW is connected to the left-channel terminal 3pL of a 3-pole miniplug 3ps, and a resistor Rd for plug identification is connected across the right-channel terminal 3pR and the left-channel terminal 3pL of the 3-pole miniplug 3ps.

When the television camera/recorder 10R is set for a reproducing mode and the plug 3ps is plugged in the jack 11ds, the right-channel terminal 11dR and the left-channel 11dL of the jack 11ds are connected through the right-channel terminal 3pR of the plug 3ps, the resistor Rd and the left-channel terminal 3pL of the plug 3ps, the dc supply voltage V15 provided by the power control circuit 15 is divided by the resistor Rd of the plug 3ps and the resistor Rb of the plug identifying circuit 17 and, for example, half the dc supply voltage V15 is applied to the base of the transistor Q17 to turn on the transistor Q17. Consequently, the collector voltage of the transistor Q17 applied to one of the input terminals of the OR gate 18 goes LOW, the output of the OR gate, i.e., a control signal, is given to the switch 16 to close the switch 16, whereby the RF conversion circuit 32 is actuated to send the carrier television signals Srf through the antenna switch 3 to a television receiver.

When the television camera/recorder 10R is set for a televising mode and the 2-pole miniplug 3p of an external microphone is plugged in the jack 11ds, the right-channel terminal 11dR and the left-channel terminal 11dL of the jack 11ds are short-circuited by the plug 3p to ground the base of the transistor Q17 and, consequently, the transistor Q17 is turned off. Consequently, the collector voltage of the transistor Q17 applied to one of the input terminal of the OR gate 18 goes HIGH, and the output signal, i.e., a control signal, of the OR gate 18 is given to the switch 16 to open the switch 16, whereby the RF conversion circuit 32 is disconnected from the power supply and the transmission of carrier television signals Srf is stopped. Consequently, television receivers in the neighborhood are not disturbed.

When a suitable voltage comparator, not shown, is provided on the input side of the transistor Q17, the resistance of the resistor Rd of the plug 3ps can be recognized, which enables further accurate identification of the plug plugged in the jack 11ds.

Figure 7:
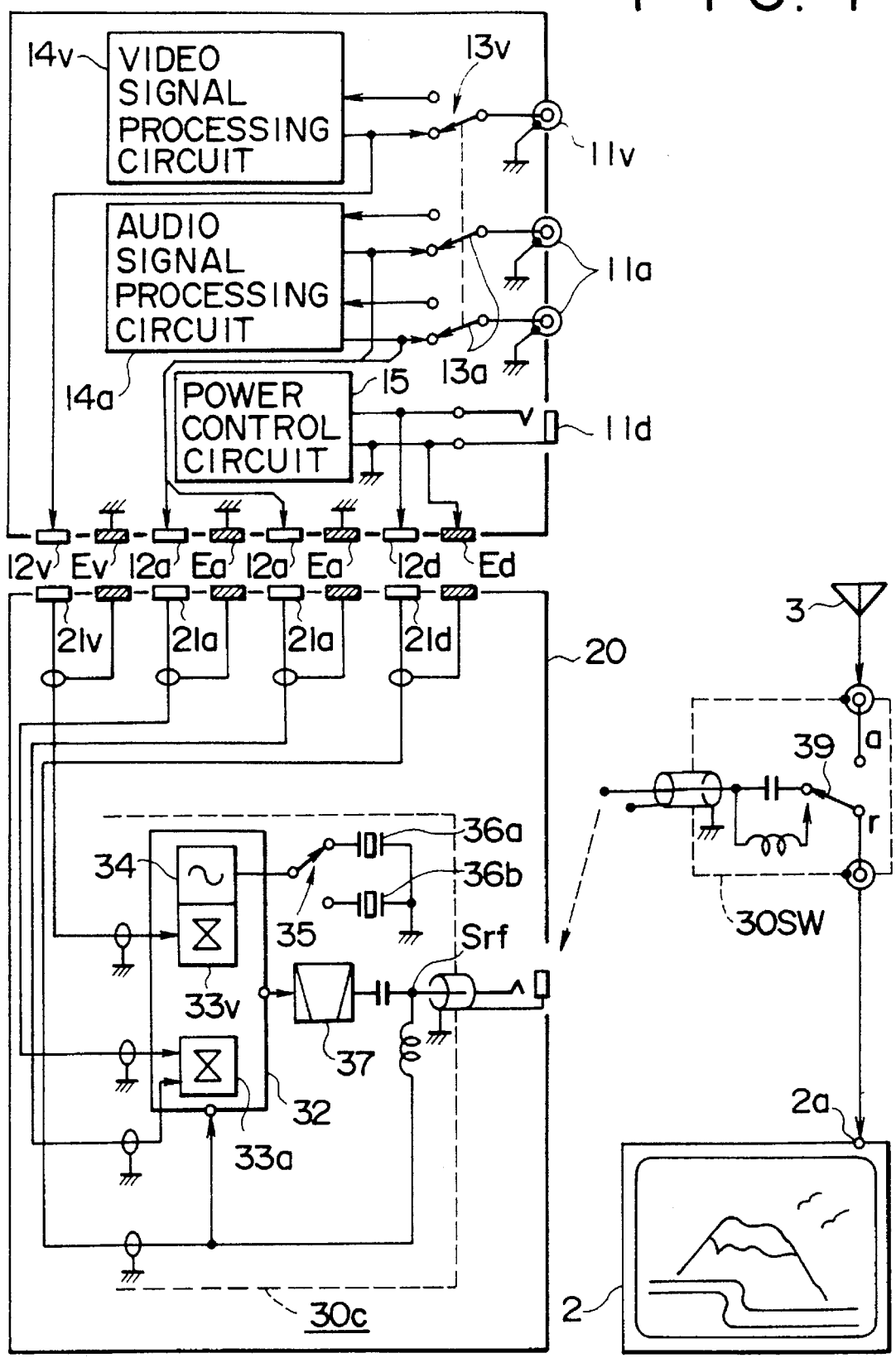
FIG. 7 is a circuit diagram of a reproduced signal transmission system incorporated into a television camera/recorder in a second embodiment according to the present invention.
Figure 8:
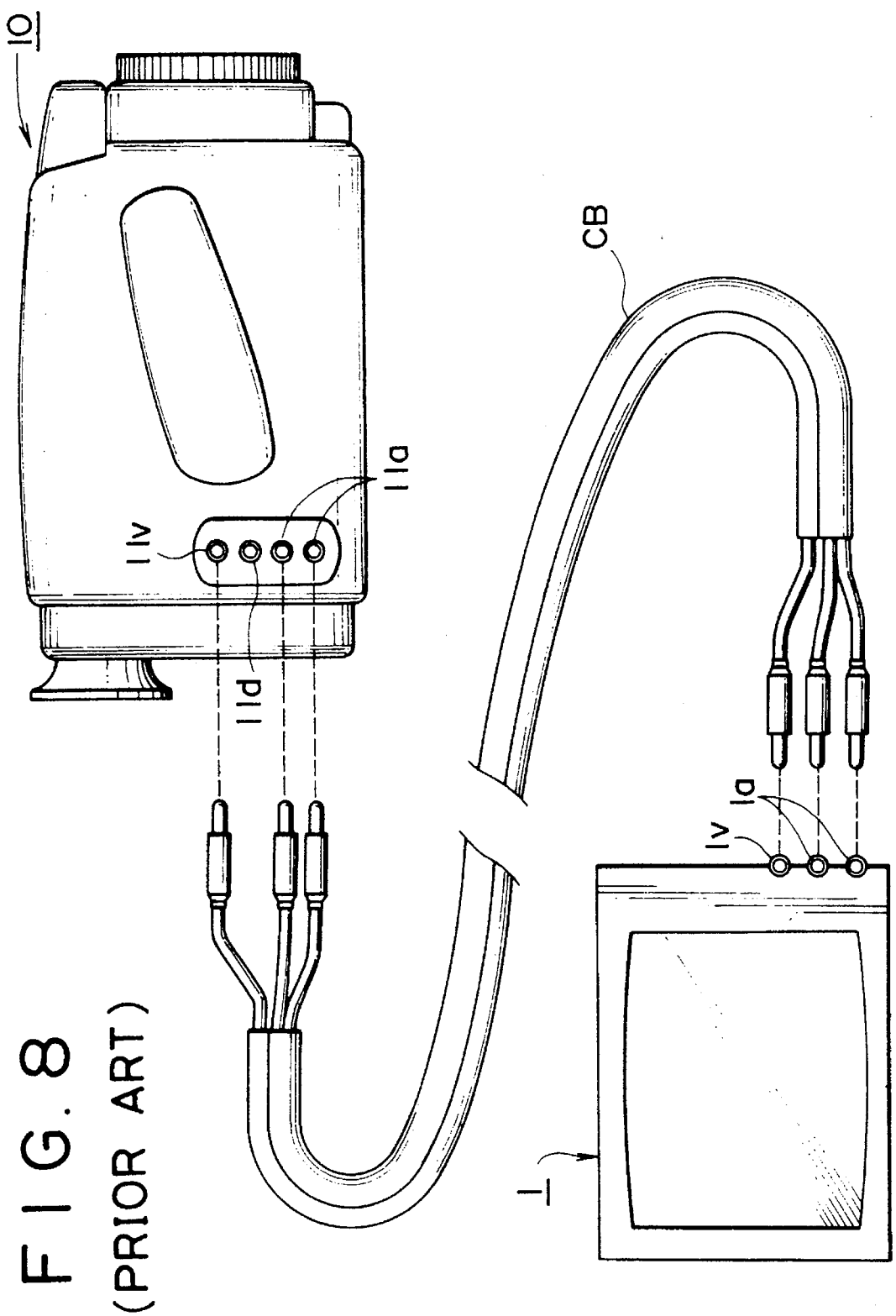
FIG. 8 is a side view of a conventional television camera/recorder.
Figure 9:
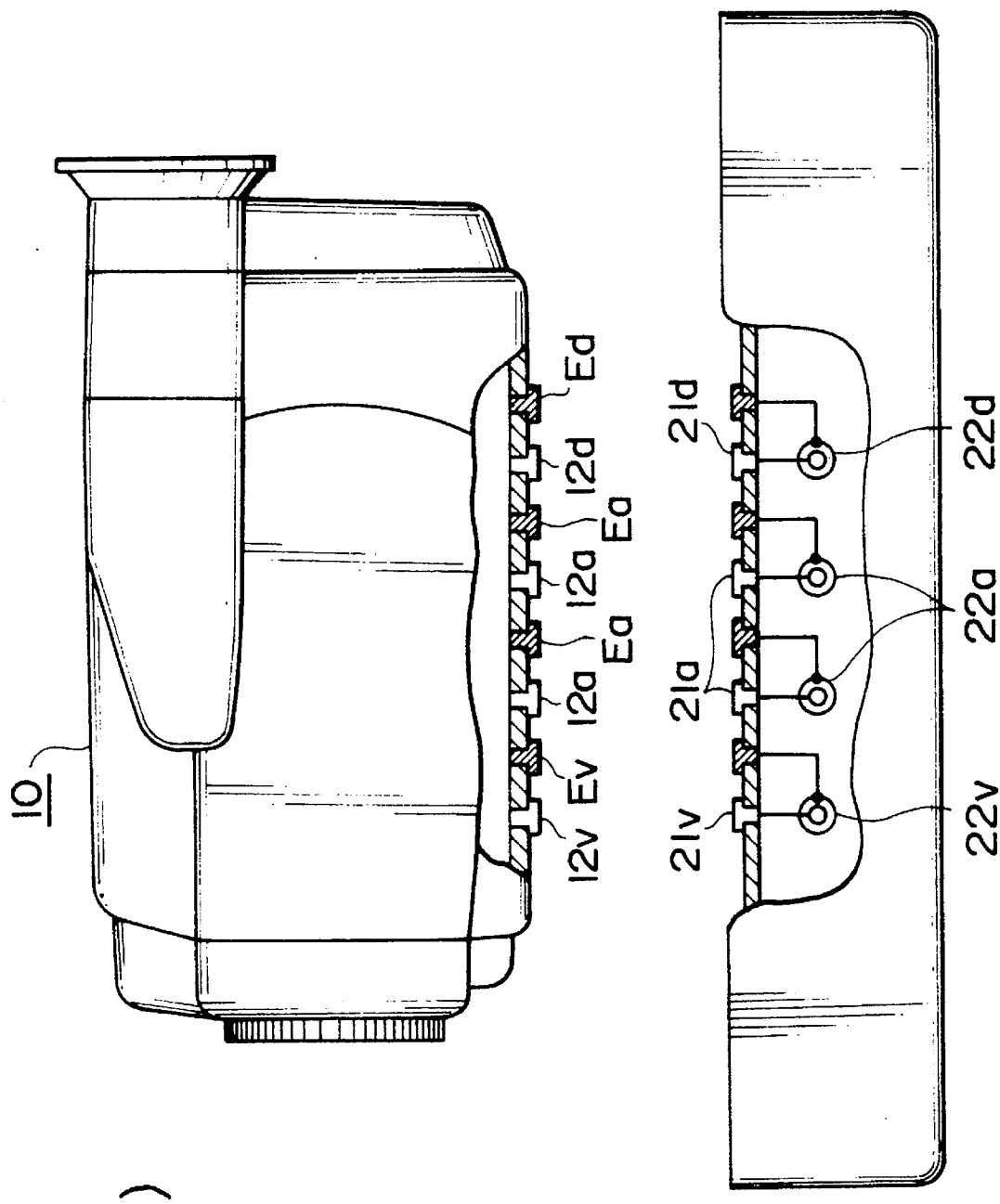
FIG. 9 is a partly cutaway side view of a conventional television camera/recorder.

FIG. 7 shows the second embodiment of the present invention wherein the circuitry of FIG. 10 is rearranged and repositioned so that the RF converter 30C is located in the adapter unit 20. The electric connections to the RF converter 30C are then made using the electrical contacts 21a, 21d and 21v.

A television camera/recorder in a third embodiment according to the present invention will be described hereinafter with reference to FIG. 6, in which parts like or corresponding to those shown in FIG. 1 are denoted by the same reference characters and the description thereof will be omitted to avoid duplication.

In the television camera/recorder 10R integrally provided with the RF converter 30 as shown in FIG. 3, it is very difficult to change the television channel of the carrier television signals Srf provided by the RF converter by the mechanical switch 35 (FIG. 1). Generally, the television camera/recorder is provided with a microcomputer for controlling the optical components of the camera unit for focusing and exposure, and operations for setting the television camera/recorder for a desired televising mode, adjusting picture quality and the like can be carried out by a predetermined procedure and the results of operations can be confirmed by recognizing information displayed on the screen of the viewfinder or a monitoring display.

Figure 6:
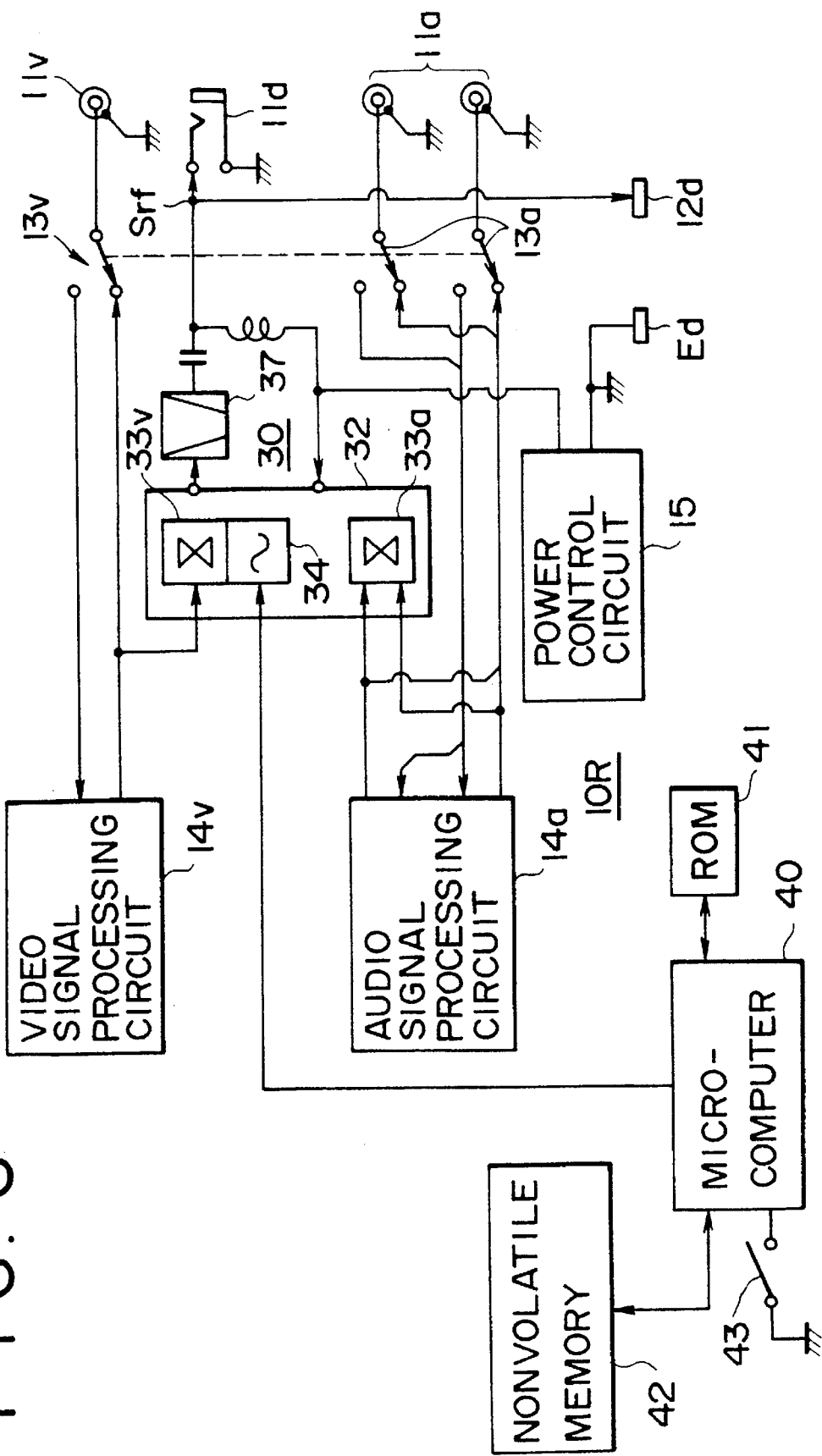
FIG. 6 is a circuit diagram of an essential portion of a television camera/recorder in a third embodiment according to the present invention.

The television camera/recorder 10R shown in FIG. 6 is provided with a microcomputer 40 which executes programs for setting a television channel for the output of the RF converter 30. The oscillator 34 of the RF converter 30 is of a frequency synthesizing system employing a PLL circuit including a variable frequency demultiplier, not shown, capable of varying its demultiplying ratio.

A ROM 41 storing control programs, and a memory 42 for storing data are connected to the microcomputer 40. The memory 42 is an EEPROM (electrically erasable and programmable ROM) or a RAM backed up by a battery; that is, the memory 42 is a nonvolatile memory capable of holding stored data when the same is disconnected from the power supply. Data of the frequencies of idle television channels available in a district in which the television camera/recorder 10R is to be used is stored as default values before shipping the television camera/recorder 10R.

The television camera/recorder 10R is provided with a menu key 43. The menu key 43 is operated, for example, to display a channel setting menu on the screen of the viewfinder, not shown. When changing a default television channel for an idle television channel at the place of use of the television camera/recorder 10R, relevant keys are operated according to instructions displayed on the screen of the viewfinder to write data representing the frequency of a desired idle television channel in the memory 42.

When the RF converter 30 is in operation, the microcomputer 40 reads the frequency data representing the selected frequency and gives the frequency data to the oscillator 34 to use the desired television channel. Thus, the television camera/recorder 10R need not be provided with any keys particularly for changing the television channel to be used by the RF converter 30 because the microcomputer 40 executes a television channel setting program when the command switch is operated.

Although the adapters to be used in combination with the foregoing television camera/recorders embodying the present invention are formed in a rack, the adapters may be of any suitable construction, provided that the adapters can be easily joined to and separated from the corresponding television camera/recorders.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A television camera/recorder apparatus for processing image signals and playback signals, comprising:

an RF converter for converting playback signals into carrier television signals of a specified television channel and for sending the carrier television signals to an antenna terminal of an external television receiver;

an output jack at which the carrier television signals are superposed on dc power of a predetermined value, wherein said carrier television signals include at least one of first and second carrier television signals of different respective frequencies; and a nonvolatile memory for storing data representing default television channels associated respectively with the at least first and second carrier television signals provided by the RF converter.

2. A television camera/recorder apparatus according to claim 1, further comprising a programmable microcomputer connected to said nonvolatile memory for selecting the respective default television channel of the at least first and second carrier television signals provided by the RF converter.

3. A television camera/recorder apparatus for processing image signals and playback signals and including a case, the apparatus comprising:

an RF converter for converting playback signals into carrier television signals of a specified television channel and for sending the carrier television signals to an antenna terminal of an external television receiver;

an adaptor detachably connected to said case for receiving through a signal transferring means the carrier television signals from the RF converter and for transferring said carrier television signals to the antenna terminal of the television receiver;

an output jack at which the carrier television signals are superposed on a dc power of a predetermined value; and a plug identifying means for identifying a type of a plug connected to the output jack for controllably supplying the carrier television signals provided by the RF converter to the output jack according to the type of the plug connected to the output jack.

4. A television camera/recorder apparatus according to claim 3, further comprising a nonvolatile memory for storing data representing default television channels associated with the carrier television signals provided by the RF converter.

5. A television camera/recorder apparatus according to claim 4, further comprising a programmable microcomputer for selecting the television channel of each said carrier television signal provided by the RF converter.

6. A television camera/recorder apparatus according to claim 5, further comprising a switching device for selectively accepting signals received through the antenna terminal or signals received from the output jack, wherein the switching device accepts the signals received from the output jack when a specific dc current is supplied from the output jack to the switching device.

7. An adapter apparatus comprising:

a case;

an RF converter for converting playback television signals into carrier television signals of a specified television channel;

an adapter incorporating the RF converter, capable of being detachably connected to the case, and connected to an antenna terminal of an external television receiver to send the carrier television signals to the antenna terminal of the external television receiver, the adapter being provided with an output jack at which the carrier television signals are superposed on dc power;

signal transferring means operating as one of a contact conduction type or a contactless conduction type for transferring the carrier television signals from the RF converter to the adapter; and a nonvolatile memory for storing data representing default television channels associated with the carrier television signals provided by the RF converter.

8. An adapter apparatus according to claim 7, further comprising a programmable microcomputer for selecting the television channel of each said carrier television signal provided by the RF converter.

9. An adapter apparatus according to claim 8, further comprising a switching device for selectively accepting signals received through the antenna terminal of the external television receiver or signals received from the output jack, wherein the switching device accepts the signals received from the output jack when a specified dc current is supplied from the output jack to the switching device.

* * * * *